(12) United States Patent
Ichikawa et al.

(10) Patent No.: US 11,226,712 B2
(45) Date of Patent: Jan. 18, 2022

(54) INFORMATION PROCESSING DEVICE AND INFORMATION PROCESSING METHOD

(71) Applicant: SONY CORPORATION, Tokyo (JP)

(72) Inventors: Hirotake Ichikawa, Tokyo (JP); Tsuyoshi Ishikawa, Kanagawa (JP); Akihiko Izumi, Kanagawa (JP); Takuya Namae, Kanagawa (JP); Kenji Hisanaga, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/085,632

(22) PCT Filed: Feb. 8, 2017

(86) PCT No.: PCT/JP2017/004467
§ 371 (c)(1),
(2) Date: Sep. 17, 2018

(87) PCT Pub. No.: WO2017/163639
PCT Pub. Date: Sep. 28, 2017

(65) Prior Publication Data
US 2019/0095071 A1 Mar. 28, 2019

(30) Foreign Application Priority Data
Mar. 24, 2016 (JP) .............................. JP2016-059786

(51) Int. Cl.
*G06F 3/0481* (2013.01)
*G06F 3/0484* (2013.01)
(Continued)

(52) U.S. Cl.
CPC ........ *G06F 3/04812* (2013.01); *G06F 3/0484* (2013.01); *G06F 3/0486* (2013.01);
(Continued)

(58) Field of Classification Search
CPC ...................... G06F 3/04842; G06F 3/04812
See application file for complete search history.

(56) References Cited

U.S. PATENT DOCUMENTS 6,760,048 B1 * 7/2004 Bates .................... G06F 3/0481
715/781
9,345,973 B1 * 5/2016 Antkowiak ......... G07F 17/3209
(Continued)

FOREIGN PATENT DOCUMENTS

| CN | 101268437 A | 9/2008 |
|---|---|---|
| CN | 104025005 A | 9/2014 |

(Continued)

OTHER PUBLICATIONS

International Search Report and Written Opinion of PCT Application No. PCT/JP2017/004467, dated May 9, 2017, 09 pages of ISRWO.
(Continued)

*Primary Examiner* — Scott T Baderman
*Assistant Examiner* — Seung Woon Jung
(74) *Attorney, Agent, or Firm* — Chip Law Group

(57) ABSTRACT

There is provided an information processing device including a processing unit that controls a display device to simultaneously display a plurality of objects on an output region of the display device, determines occurrence of competition of an output region on a basis of a user operation, and allows a notification of the occurrence of the competition depending on a determining result.

8 Claims, 8 Drawing Sheets

(51) Int. Cl.
    *G09G 5/14*         (2006.01)
    *G06F 3/0486*     (2013.01)
    *G06F 3/0488*     (2013.01)
    *G06F 3/14*         (2006.01)

(52) U.S. Cl.
    CPC ........ *G06F 3/04886* (2013.01); *G06F 3/1454* (2013.01); *G09G 5/14* (2013.01); *G06F 2203/04803* (2013.01); *G06F 2203/04804* (2013.01); *G09G 2340/04* (2013.01); *G09G 2340/045* (2013.01); *G09G 2340/0464* (2013.01); *G09G 2354/00* (2013.01)

(56) References Cited

U.S. PATENT DOCUMENTS

| | | |
|---|---|---|
| 2002/0175924 A1 | 11/2002 | Yui et al. |
| 2009/0091430 A1* | 4/2009 | Ryan ................ G09B 21/006 340/384.1 |
| 2009/0138811 A1* | 5/2009 | Horiuchi ............ G06F 3/04842 715/768 |
| 2014/0019873 A1* | 1/2014 | Gupta ................ H04L 67/36 715/744 |
| 2014/0225847 A1* | 8/2014 | Sakayori ............ G06F 3/0488 345/173 |
| 2014/0282074 A1* | 9/2014 | Laukkanen .......... G06F 3/0482 715/750 |
| 2014/0344750 A1 | 11/2014 | Takahashi et al. |

FOREIGN PATENT DOCUMENTS

| | | |
|---|---|---|
| JP | 03-269487 A | 12/1991 |
| JP | 10-031573 A | 2/1998 |
| JP | 10-177466 A | 6/1998 |
| JP | 11-338458 A | 12/1999 |
| JP | 2000-207090 A | 7/2000 |
| JP | 2004-094423 A | 3/2004 |
| JP | 2007/052382 A1 | 5/2007 |
| JP | 2007-328444 A | 12/2007 |
| JP | 2009-031863 A | 2/2009 |
| JP | 2009-087026 A | 4/2009 |
| JP | 2013-149016 A | 8/2013 |
| WO | 2007/052382 A1 | 5/2007 |
| WO | 2013/108349 A1 | 7/2013 |
| WO | 2014/057814 A1 | 4/2014 |

OTHER PUBLICATIONS

Office Action for JP Patent Application No. 2018-507108, dated Apr. 6, 2021, 5 pages of Office Action and 5 pages of English Translation.

Office Action for JP Patent Application No. 2018-507108, dated Oct. 12, 2021, 2 pages of Office Action and 2 pages of English Translation.

\* cited by examiner

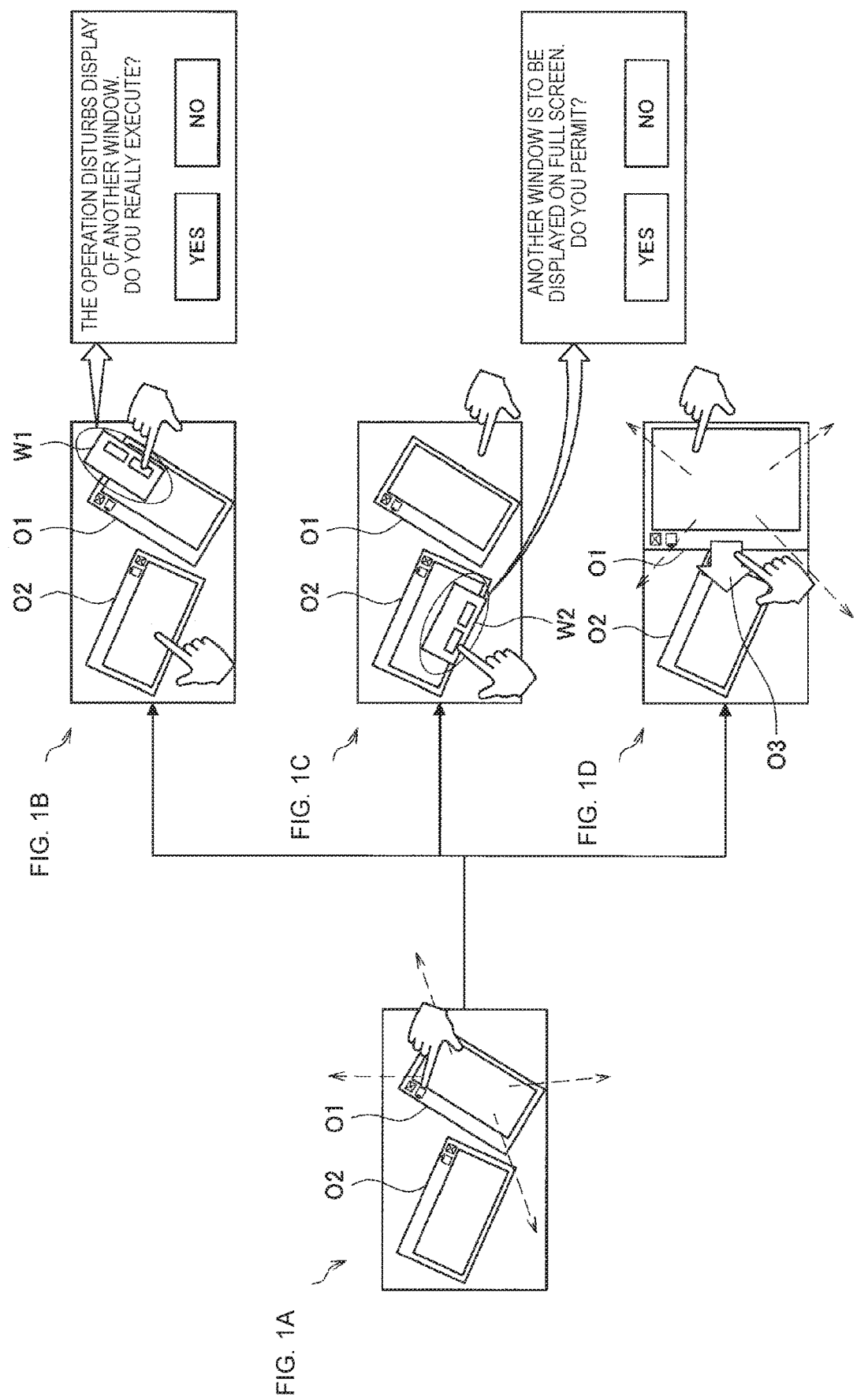

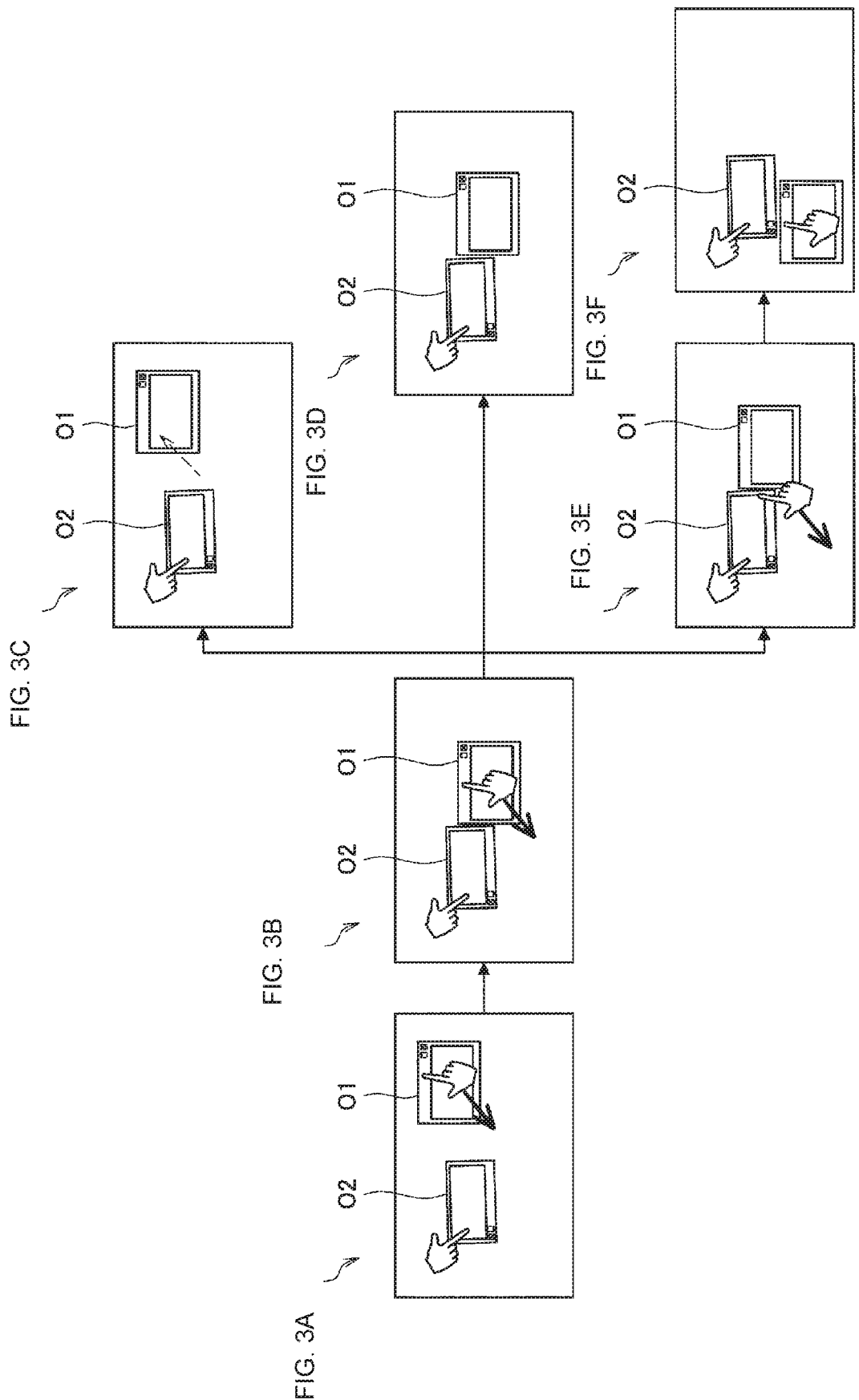

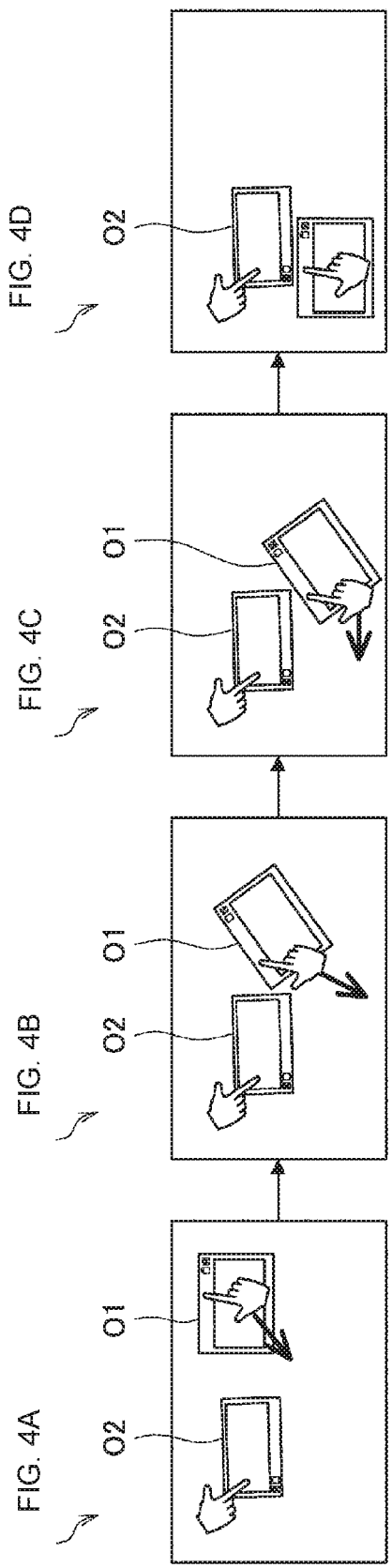

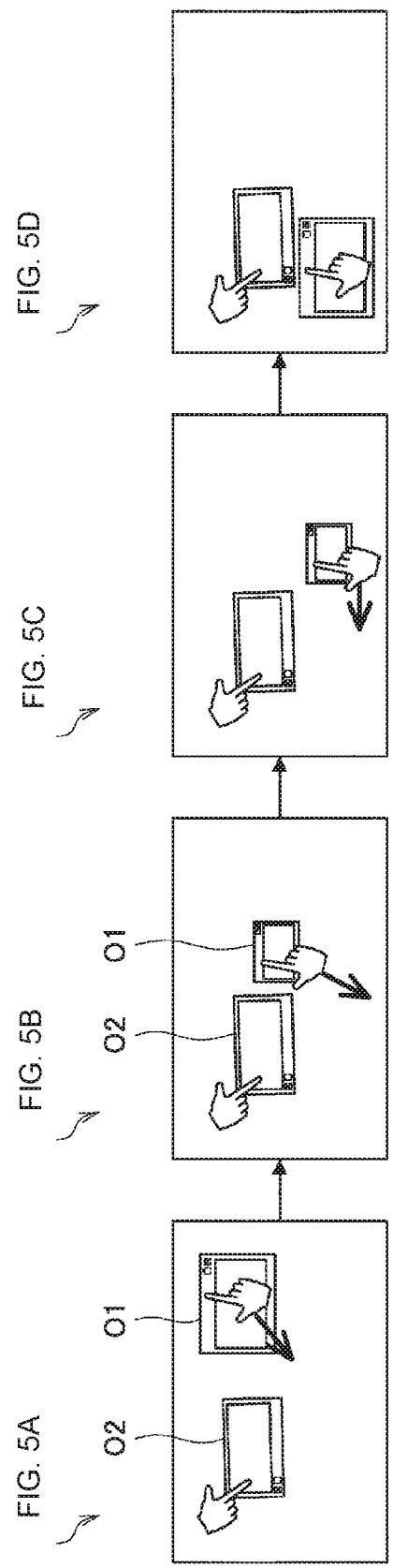

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/004467 filed on Feb. 8, 2017, which claims priority benefit of Japanese Patent Application No. JP 2016-059786 filed in the Japan Patent Office on Mar. 24, 2016. Each of the above-referenced applications is hereby incorporated herein by reference in its entirety.

TECHNICAL FIELD

The present disclosure relates to an information processing device, an information processing method, and a program.

BACKGROUND ART

Such a technology is developed of a device operable by one user or more. As a technology for a video display device operable by one user or more, there is, for example, a technology described in the following Patent Literature 1.

CITATION LIST

Patent Literature

Patent Literature 1: JP 2009-087026A

DISCLOSURE OF INVENTION

Technical Problem

For example, it is possible to realize an operation of a plurality of users to an operable region where the user operation is possible on a display screen for displaying an object of a graphical user interface (GUI) by using the technology described in Patent Literature 1.

Herein, in a case where the operation is possible to the operable region by a plurality of users as mentioned above, display change of the object by the one user operation can disturb the display of the object operated by another user. Further, in the case where "the display change of the object by one user operation disturbs the occurrence of the display of the object by the operation of another user" as mentioned above, there is a possibility of deterioration in convenience of the other user. However, for example, with the technology described in Patent Literature 1, there is no consideration to the case where "the display change of the object by one user operation disturbs the occurrence of the display change of the object by the operation of another user" as mentioned above.

According to the present disclosure, novel and improved information processing device, information processing method, and program are proposed to enable the improvement in user's convenience.

Solution to Problem

According to the present disclosure, there is provided an information processing device including: a processing unit that determines occurrence of competition of an output region on a basis of a user operation, and allows a notification of the occurrence of the competition depending on a determining result.

In addition, according to the present disclosure, there is provided an information processing method executed by an information processing device, including: a step of determining occurrence of competition of an output region on a basis of a user operation, and allowing a notification of the occurrence of the competition depending on a determining result.

In addition, according to the present disclosure, there is provided a program for causing a computer to execute: a step of determining occurrence of competition of an output region on the basis of a user operation, and allowing a notification of the occurrence of the competition depending on a determining result.

Advantageous Effects of Invention

According to the present disclosure, it is possible to improve user's convenience.

Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 1A, 1B, 1C, and 1D are explanatory diagrams for illustrating an example of processing of an information processing method according to the embodiment.

FIGS. 3A, 3B, 3C, 3D, 3E, and 3F are explanatory diagrams for illustrating an example of processing of an information processing method according to the embodiment.

FIGS. 4A, 4B, 4C, and 4D are explanatory diagrams for illustrating an example of processing of an information processing method according to the embodiment.

FIGS. 5A, 5B, 5C, and 5D are explanatory diagrams for illustrating an example of processing of an information processing method according to the embodiment.

MODE(S) FOR CARRYING OUT THE INVENTION

Figure 2A:
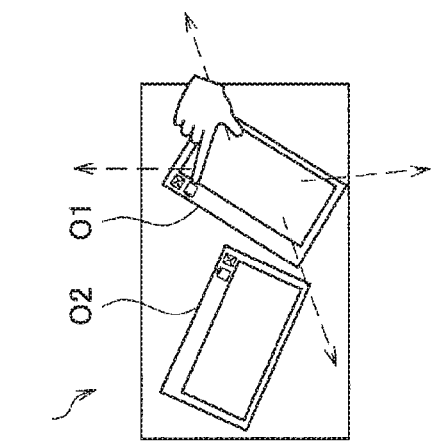
FIGS. 2A, 2B, and 2C are explanatory diagrams for illustrating an example of processing of an information processing method according to the embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, hereinbelow, the description will be given in the following order.

1. Information processing method according to the embodiment
2. Information processing device according to the embodiment
3. Program according to the embodiment

Information Processing Method According to the Embodiment

First, a description will be given of an information processing method according to the embodiment. Hereinbelow, the description will be given of the information processing method according to the embodiment with an example of a case of performing processing of the information processing method according to the embodiment by an information processing device according to the embodiment.

[1] Processing of Information Processing Method According to the Embodiment

[1-1] First Example of Processing of Information Processing Method According to the Embodiment As mentioned above, such a case is assumed that an operation possible to an operable region by a plurality of users. Display change of an object by the one user operation can disturb the display of the object operated by another user.

Accordingly, the information processing device according to the embodiment determines the occurrence of competition of an output region on the basis of the user operation, and allows a notification of the occurrence of the competition in response to a determining result (competitive notification control processing).

In a case of determining that the competition occurs, the information processing device according to the embodiment allows the user to notify that the competition occurs. The information processing device according to the embodiment allows the user to notify that the competition occurs by, for example, a "visual notification that a character, an image, or a window is displayed on a display screen, a lamp is lit on, or the like", an "auditory notification that sound (including music) is output from a sound output device such as a speaker", a "tactile notification such as vibration of a vibrating device", or a notification of combination of the above notifications.

Herein, as the output region according to the embodiment, for example, there can be individual display regions of a plurality of objects that are simultaneously displayed on a display screen such as a display device or a screen. Further, as the object according to the embodiment, for example, there can be an object that can be an operating target of the user, such as an object of a GUI of a window, an icon, or the like.

The object according to the embodiment may be, for example, an object shared by a plurality of users, or an object linked to each user. As an object linked to each user according to the embodiment, there can be, for example, an object corresponding to identification information (for example, user ID) indicating the user. The object linked to each user is displayed on, for example, a display screen with a login operation of the user.

Further, as the competition of the output region according to the embodiment, there can be a state of overlapping the display regions of a plurality of objects. Herein, a case of overlapping at least a part of the display regions of a plurality of objects corresponds to competition of an output region. It is noted that it can be arbitrarily set to which case with an overlapping degree corresponds to the competition of the output region.

Further, for example, in a case of setting the priority to the individual objects, the competition of the output region according to the embodiment may be a state of overlapping the display regions of a plurality of objects set with the same priority.

Herein, in the case of setting the priority to the individual objects, the priority order of display is determined depending on the priority, and the display of the object with higher priority is preferentially performed. For example, in a case of setting the priority to the individual objects, as the set priority is higher, the object is preferentially displayed on the front side of the display screen. Further, in the case of setting the priority to the individual objects, the priority order is not determined with the priority between the objects with the same priority. Accordingly, as mentioned above, in the case where the priority is set to the individual objects and the display regions of a plurality of objects set with the same priority are overlapped, the competition of the output region is set. It is noted that, later, a description will be given of an example of processing of the information processing method according to the embodiment in the case of setting the priority to the individual objects.

As the user operation in a case where the output region according to the embodiment is the display regions of the individual objects displayed at the same time as mentioned above, there can be, for example, "a direct operation to the display screen such as a pinch operation or a flick operation (e.g., an example of the operation in a case where the display screen is that of a touch screen)" and "an indirect operation to the display screen using an operating device such as a mouse, a keyboard, or a remote controller".

With the above user operation, the display region of the object is changed, for example, as follows. As a consequence, the output region according to the embodiment is changed.

The display region of the object is moved.
The display region of the object is expanded or reduced.
Combination of the above.

It is noted that the output region according to the embodiment is not limited to the display regions of the individual objects displayed at the same time.

For example, the output region according to the embodiment may be a region corresponding to the sound directivity. In a case where the output region according to the embodiment is the region corresponding to the sound directivity, a state of overlapping a region for sound output corresponds to the competition of the output region.

Further, as a user operation in the case where the output region according to the embodiment is the region corresponding to the sound directivity, there can be, for example, an arbitrary operation for enabling the change of the sound directivity.

Hereinbelow, an example will mainly be given to the case where the output region according to the embodiment is the display regions of the individual objects displayed at the same time as mentioned above.

FIGS. 1A, 1B, 1C, and 1D are explanatory diagrams for illustrating an example of processing of the information processing method according to the embodiment. FIGS. 1A, 1B, 1C, and 1D illustrate a case of simultaneously displaying two objects, i.e., objects O1 and O2 on the display screen.

As illustrated in FIG. 1A, a case is considered where a user presses an expand button for expanding the display region included in the object O1. Herein, the expand button according to the embodiment may be a button for expanding the object to the whole display screen, or a button for expanding the object to a predetermined rate of the display screen (for example, a button for expansion to ½, ¼, or the like of the display screen).

As mentioned above, in the case where the expand button of the object O1 is pressed and the display region of the object O1 is expanded with the pressing operation (as an example of the user operation), the display region of the object O1 is overlapped to the display region of the object O2, that is, the competition of the output region can occur.

The information processing device according to the embodiment determines whether or not the competition occurs on the basis of the user operation like, for example, the operation for pressing the expand button.

Specifically, the information processing device according to the embodiment determines that the competition occurs in a case where, for example, it is predicted that the competition of the output region occurs.

For example, in a case of performing an operation for pressing the expand button of the object O1 illustrated in FIG. 1A (as an example of the user operation, hereinbelow, similar), the information processing device according to the embodiment predicts the occurrence of the competition of the output region by content of the expanding processing corresponding to the pressed expand button, a position of the display region corresponding to the object O1, and a position of the display region corresponding to another object such as the object O2. The information processing device according to the embodiment simulates, for example, the expanding processing of the display region of the object O1, and predicts that the competition of the output region occurs in a case where the display region of the object O1 is overlapped to that of another object as a simulation result.

It is noted that the user operation relating to the expansion of the object O1 illustrated in FIG. 1A is not limited to the pressing of the expand button, and may be, for example, a pinch operation relating to the expansion of the object O1 (e.g., an operation for increasing the distance between fingers after touching the display screen with two fingers, as an example of the user operation).

In a case of performing the pinch operation relating to the expansion of the object O1 as mentioned above, the information processing device according to the embodiment predicts the occurrence of the competition of the output region by, for example, the content of the expanding processing performed with the pinch operation, the position of the display region corresponding to the object O1, and the position of the display region corresponding to another object such as the object O2, similarly to, for example, the case of executing the operation for pressing the expand button. It is possible to specify contents of the expanding processing performed with the pinch operation (e.g., an enlargement factor) on the basis of, for example, the distance between the fingers, acceleration of a moved finger, or the like.

Further, the information processing device according to the embodiment may determine that the competition occurs in a case of detecting, for example, the competition of the output region.

For example, in a case of performing the operation for pressing the expand button of the object O1 illustrated in FIG. 1A or the pinch operation relating to the expansion of the object O1 as mentioned above, the information processing device according to the embodiment detects the competition of the output region at time for next updating the display of the display screen (e.g., display updating timing of a next frame).

For example, in a case of determining that the competition occurs as a result of determining whether or not the competition occurs on the basis of the user operation as mentioned above, the information processing device according to the embodiment allows a notification that the completion occurs to the user.

Further, in a case where it is not determined that the competition occurs as a result of determining whether or not the competition occurs on the basis of the user operation, the information processing device according to the embodiment does not send a notification to the user. In the case where it is not determined that the competition occurs, the display of the object is changed with the performed user operation.

Herein, an example will be illustrated of a case where the user performs the operation for pressing for pressing the expand button of the object O1 illustrated in FIG. 1A and a notification is sent that the competition occurs to the user.

(1) First Example of Notification (FIG. 1B)

FIG. 1B illustrates an example of a notification in a case where the information processing device according to the embodiment determines that the competition occurs at time for predicting that the competition of the output region occurs.

For example, as illustrated FIG. 1B, the information processing device according to the embodiment allows the display of a window W1 of an explanation that another object is disturbed and a button for allowing the user to select whether or not the expanding processing is executed with the operation for pressing the expand button of the object O1, at a position corresponding to the object O1. As the position corresponding to the object O1, for example, as illustrated in FIG. 1B, there can be a position where the window W1 is overlapped to the object O1.

For example, in a case of performing an operation for pressing a YES button (button for executing processing with the operation for pressing the expand button of the object O1) to the window W1 illustrated in FIG. 1B, the information processing device according to the embodiment performs the expanding processing of the object O1 with the operation for pressing the expand button of the object O1. Further, in a case of setting the priority to the individual objects, for example, the priority set to the object O1 is set as a maximal value, or the like. After setting the priority set to the object O1 to be higher than that of another object, the expanding processing may be performed. It is noted that, for example, an external device of the information processing device according to the embodiment may perform the expanding processing of the object O1 with the operation for pressing the expand button of the object O1 or the processing for setting the priority.

In the case of performing the operation for pressing the YES button as mentioned above, because of a state of permitting the occurrence of the competition of the output region by the user, even in a case where the competition of the output region occurs, the possibility for deterioration of user's convenience is low.

Further, for example, in a case of performing an operation for pressing a NO button (button for canceling the execution of the processing with the operation for pressing the expand button of the object O1) on the window W1 illustrated in FIG. 1B, the information processing device according to the embodiment cancels the execution of the expanding processing of the object O1 with the operation for pressing the expand button of the object O1, and does not execute the expanding processing. It is noted that, for example, an external device of the information processing device according to the embodiment may perform the processing for canceling the expanding processing of the object O1 with the operation for pressing the expand button of the object O1.

The above-mentioned case of performing the operation for pressing the NO button is a state in which the user does not permit the occurrence of the competition of the output region. Therefore, the expanding processing of the object O1 is not performed with the operation for pressing the expand button of the object O1, and the occurrence of the competition of the output region is consequently prevented. That is, for example, the operation for pressing the NO button on the window W1 illustrated in FIG. 1B corresponds to an example of the operation for preventing the competition of the output region.

(2) Second Example of Notification (FIG. 1C)

FIG. 1C illustrates another example of the notification in the case where the information processing device according to the embodiment predicts that the competition of the output region occurs and determines that the competition occurs.

For example, as illustrated in FIG. 1C, the information processing device according to the embodiment allows the display of a window W2 for displaying an explanation that another object is expanded and a button for allowing the user to select whether or not the expanding processing is executed with the operation for pressing the expand button of the object O1, at a position corresponding to the object O2. As the position corresponding to the object O2, for example, as illustrated in FIG. 1C, there can be a position where the window W2 is overlapped to the object O2.

For example, in a case of performing the operation for pressing the YES button (button for permitting to execute the processing with the operation for pressing the expand button of the object O1) on the window W2 illustrated in FIG. 1C, the information processing device according to the embodiment performs the expanding processing of the object O1 with the operation for pressing the expand button of the object O1. Further, in the case of setting the priority to the individual objects, the expanding processing may be performed by setting, for example, the priority set to the object O1 as a maximal value, that is, setting the priority set to the object O1 to be higher than that of another object. It is noted that an external device of the information processing device according to the embodiment may perform the above-mentioned expanding processing of the object O1 with the operation for pressing the expand button of the object O1 or the processing for setting the priority.

In the case of performing the operation for pressing the YES button as mentioned above, such a state is obtained that the user permits the occurrence of the competition of the output region. Therefore, even in a case where the competition of the output region occurs, the possibility for deterioration of user's convenience is low.

Further, for example, in a case of performing the operation for the NO button (button for non-permitting to execute the processing with the operation for pressing the expand button of the object O1) on the window W2 illustrated in FIG. 1C, the information processing device according to the embodiment cancels the execution of the expanding processing of the object O1 with the operation for pressing the expand button of the object O1, that is, does not execute the expanding processing. It is noted that an external device of the information processing device according to the embodiment may perform the above-mentioned processing for canceling the expanding processing of the object O1 with the operation for pressing the expand button of the object O1.

In the case of performing the operation for pressing the NO button as mentioned above, such a state is obtained that the user does not permit the occurrence of the competition of the output region. Therefore, the expanding processing of the object O1 with the operation for pressing the expand button of the object O1 is not performed and the occurrence of the competition of the output region is consequently prevented. That is, for example, the operation for pressing the NO button on the window W2 illustrated in FIG. 1C corresponds to an example of the operation for preventing the competition of the output region.

(3) Third Example of Notification (FIG. 1D)

FIG. 1D illustrates an example of a notification in a case where the competition of the output region is detected and the information processing device according to the embodiment determines that the competition occurs.

For example, as illustrated in FIG. 1D, in a case of determining that the competition between the object O1 and the object O2 occurs, the information processing device according to the embodiment interrupts the expanding processing of the object O1, and allows an object O3 relating to the notification to be displayed at positions corresponding to the object O1 and the object O2. As the positions corresponding to the object O1 and the object O2, there are, for example, positions for overlapping the object O3 relating to the notification to the object O1 and the object O2 as illustrated in FIG. 1D.

Herein, FIG. 1D illustrates an example where the object O3 relating to the notification is an arrow-shaped object. The object relating to the notification according to the embodiment is not limited to the arrow-shaped object illustrated in FIG. 1D.

For example, in a case of performing a predetermined operation (example of the operation for permitting to execute the processing with the operation for pressing the expand button of the object O1) such as a touch operation or a tracing operation to the object O3 relating to the notification illustrated in FIG. 1D, the information processing device according to the embodiment performs the expanding processing of the object O1 with the operation for pressing the expand button of the object O1 that is interrupted. Further, in the case of setting the priority to the individual objects, for example, the expanding processing may be performed by setting the priority set to the object O1 as a maximal value, that is, setting the priority set to the object O1 to be higher than that of another object. It is noted that, for example, an external device of the information processing device according to the embodiment may perform the above-mentioned expanding processing of the object O1 with the operation for pressing the expand button of the object O1 or processing for setting the priority.

In the case of performing a predetermined operation to the object O3 relating to the notification as mentioned above, because of a state in which the user permits the occurrence of the competition of the output region, even in a case where the competition of the output region occurs, the possibility for deterioration of user's convenience is low.

Further, for example, in a case of not-performing a predetermined operation (an example of the operation for permitting to execute the processing with the operation for pressing the expand button of the object O1) such as a touch operation or a tracing operation of the object O3 relating to the notification illustrated in FIG. 1D within a set period after displaying the object O3 relating to the notification, the information processing device according to the embodiment performs the preventing processing of the competition of the output region.

Herein, the set period may be, for example, a fixed period that is preset or a varying period that can be changed by the user operation.

As the preventing processing in the case of performing the expanding processing of the object, there is, for example, the following processing.

Processing for canceling the change of the output region with the user operation relating to the occurrence of the competition of the output region (for example, the object O1 illustrated in FIG. 1D returns to the state of the object O1 before pressing the expand button illustrated in FIG. 1A by the cancel processing).

Processing for interrupting the change of the output region with the user operation relating to the occurrence of the competition of the output region (for example, the object O1 is still in the state of the object O1 illustrated in FIG. 1D by the interrupt processing).

It is noted that the preventing processing according to the embodiment is not limited to the above-illustrated example. The preventing processing according to the embodiment can be performed in a case of performing, for example, processing for moving the object, that is, performing another processing other than the expanding processing of the object. An example of preventing processing according to the embodiment will be described later.

In the case where a predetermined operation is not performed to the object O3 relating to the notification within the set period as mentioned above, such a state is obtained that the user does not permit the occurrence of the competition of the output region. Therefore, the expanding processing of the object O1 with the operation for pressing the expand button of the object O1 interrupts and is not thereafter performed. As a consequence, the occurrence of the competition of the output region is prevented. That is, for example, a fact that a predetermined operation is not performed to the object O3 relating to the notification within the set period corresponds to an example of the operation for preventing the competition of the output region.

In a case of detecting the operation for preventing the competition of the output region after notifying the occurrence of the competition, like the case where a predetermined operation is not performed to the object O3 relating to the notification within the set period, the information processing device according to the embodiment performs the preventing processing for preventing the competition of the output region. The competition of the output region is prevented by performing the preventing processing. Therefore, the deterioration of user's convenience can be prevented.

(4) Another Example of Notification

The information processing device according to the embodiment is not limited to, for example, the first example illustrated in the above (1) to the third example illustrated in the above (3).

For example, the information processing device according to the embodiment can send the notification by allowing the display at the following positions of the windows relating to the notification such as the window W1 illustrated in FIG. 1B and the window W2 illustrated in FIG. 1C and the object relating to the notification like the object O3 relating to the notification illustrated in FIG. 1D. The information processing device according to the embodiment specifies positions illustrated in the following by analyzing, for example, the captured image captured by the user by using an arbitrary image processing technology.

Position of an operating member that performs the operation to the display screen thereon (for example, a position corresponding to the finger tip of the user on the display screen, or the like)

Position corresponding to a predetermined part of the user on the display screen (for example, a position corresponding to the back part of the hand of the user on the display screen, or the like)

Further, as mentioned above, the notification is not limited to the "visual notification", but the information processing device according to the embodiment can perform, for example, "auditory notification", "tactile notification", and "notification of combination of two or more of the visual notification, the auditory notification, and the tactile notification".

As the processing of the information processing method according to the embodiment, the information processing device according to the embodiment performs, for example, the above-mentioned competitive notification control processing, and allows a notification that the competition occurs depending on a determining result of the occurrence of the competition of the output region based on the user operation.

The information processing device according to the embodiment performs the competitive notification control processing, thereby realizing a system for sending a notification about the occurrence of the competition of the output region to the user on a system on environment where a plurality of persons in the example illustrated in FIGS. 1A, 1B, 1C, and 1D can perform a simultaneous operation (or a device on the environment, hereinbelow, similar).

Therefore, the information processing device according to the embodiment performs the competitive notification control processing and, under environment in which a plurality of persons can perform the simultaneous operation as illustrated in the example in FIGS. 1A, 1B, 1C, and 1D, the individual users thus can use the system under environment safely without paying attention to a using situation of the system under the environment of another user. Further, the information processing device according to the embodiment performs the competitive notification control processing, thereby enabling a more comfortable user operation under environment in which a plurality of persons can perform the simultaneous operation as illustrated in the example in FIGS. 1A, 1B, 1C, and 1D.

Therefore, the information processing device according to the embodiment performs the above-mentioned competitive notification control processing as the processing of the information processing method according to the embodiment, thereby improving user's convenience. Further, the information processing device according to the embodiment performs the competitive notification control processing, thereby enabling the promotion to use the system of more users on the environment where a plurality of persons can perform a simultaneous operation, as illustrated in the example in FIGS. 1A, 1B, 1C, and 1D.

[1-2] Second Example of Processing of Information Processing Method According to the Embodiment It is noted that the processing of the information processing method according to the embodiment is not limited to the competitive notification control processing. For example, the information processing device according to the embodiment does not perform notification of the above-mentioned competitive notification control processing, but performs the preventing processing for preventing the competition of the output region. Thus, it is possible to prevent the competition of the output region.

Accordingly, next, a description will be given of the preventing processing according to the embodiment as a second example of the processing of the information processing method according to the embodiment.

As the preventing processing according to the embodiment, there can be, for example, the following processing.

Processing for canceling the change of the output region with the user operation relating to the occurrence of the competition of the output region (hereinbelow, there can be illustrated a case of "cancel processing".)

Processing for interrupt of the change of the output region with the user operation relating to the occurrence of the competition of the output region (hereinbelow, there can be illustrated a case of "interrupt processing".)

Processing for modifying how to change the output region with the user operation relating to the occurrence of the competition of the output region (hereinbelow, there can be illustrated a case of "modifying processing".)

Hereinbelow, an example of the preventing processing according to the embodiment will be illustrated with a case where the output region is the display region of each of a plurality of objects that are simultaneously displayed.

Further, hereinbelow, the object as an operation target by the user is illustrated as the "object O1", and the object of the competition of the output region is illustrated as the "object O2" by performing processing with the operation to the object O1.

(I) First Example of Preventing Processing: Change Size of Object

Figure 2B:
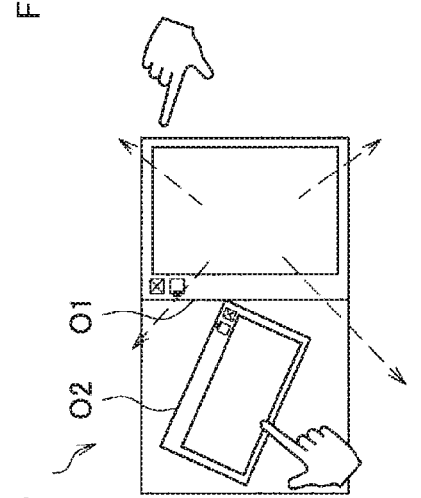
Figure 2C:
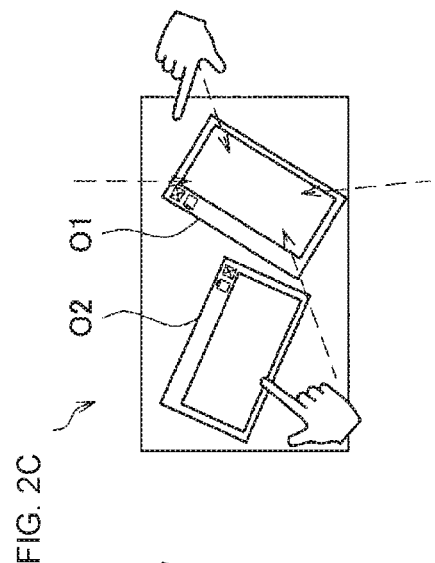

FIGS. 2A, 2B, and 2C are explanatory diagrams for illustrating an example of the processing of the information processing method according to the embodiment. FIGS. 2A, 2B, and 2C illustrate an example of display change realized by performing the preventing processing according to the embodiment in a case of changing the size of the object.
(I-1) Cancel Processing As illustrated in FIG. 2A, in a case of performing the operation for pressing the expand button of the object O1 and determining that the competition between the object O1 and the object O2 occurs, the information processing device according to the embodiment at that time cancels the expanding processing performed with the operation for pressing the expand button of the object O1.

The object O1 is changed from a state in FIG. 2A to a state in FIG. 2B by performing the above-mentioned cancel processing after performing the operation for pressing the expand button of the object O1. Thereafter, the state in FIG. 2B is changed to a state in FIG. 2C. That is, by performing the above-mentioned cancel processing after performing the operation for pressing the expand button of the object O1, the expanded object O1 returns to the state of the object O1 before pressing the expand button illustrated in FIG. 2A before the competition of the output region occurs.

Therefore, in a case of changing the size of the object, the occurrence of the competition of the output region is prevented by performing the above-mentioned cancel processing as the preventing processing.
(I-2) Interrupt Processing As illustrated in FIG. 2A, in a case of performing the operation for pressing the expand button of the object O1 and determining that the competition between the object O1 and the object O2 occurs, the information processing device according to the embodiment at that time interrupts the expanding processing with the operation for pressing the expand button of the object O1.

The object O1 is changed from the state in FIG. 2A to the state in FIG. 2B by performing the above-mentioned interrupt processing after performing the operation for pressing the expand button of the object O1.

Therefore, in a case of changing the size of the object, the occurrence of the competition of the output region is prevented by performing the above-mentioned interrupt processing as the preventing processing.
(1-3) Modifying Processing As illustrated in FIG. 2A, in the case of performing the operation for pressing the expand button of the object O1 and determining that the competition between the object O1 and the object O2 occurs, the information processing device according to the embodiment at that time changes the transparency of one or two or more objects in a plurality of objects with the competition of the output region. That is, in the example illustrated in FIGS. 2A, 2B, and 2C, the information processing device according to the embodiment changes the transparency of the object of one or both of the object O1 and the object O2 with the competition of the output region.

Herein, the information processing device according to the embodiment changes the transparency of the object by, for example, alpha blending. The information processing device according to the embodiment changes the transparency of the object of one or both of the object O1 and the object O2 with the competition of the output region by adjusting, for example, an α value of one or both of the object O1 and the object O2 with the competition of the output region. Further, the information processing device according to the embodiment may change the transparency of, for example, only a part where the competition of the output region occurs in the individual objects O1 and O2.

It is noted that the processing for changing the transparency according to the embodiment is not limited to use of the alpha blending, and arbitrary processing can be performed to enable the user to visually recognize the change of the transparency of the object.

Herein, for example, it is possible to suppress the possibility that the use of the object O2 of the user who uses the object O2 is disturbed due to the size change of the object O1 by changing the transparency of the object to more increase the transparency of the object O1. It is noted that, obviously, the transparency of the object can be changed to more reduce the transparency of the object O1.

Therefore, by performing the above-mentioned modifying processing as the preventing processing, it is possible to suppress the possibility of deterioration of the user's convenience that is caused by the occurrence of the competition of the output region.

(II) Second Example of Preventing Processing: Move Object

FIGS. 3A, 3B, 3C, 3D, 3E, 3F, 4A, 4B, 4C, 4D, 5A, 5B, 5C, and 5D are explanatory diagrams for illustrating examples of the processing of the information processing method according to the embodiment. FIGS. 3A, 3B, 3C, 3D, 3E, 3F, 4A, 4B, 4C, 4D, 5A, 5B, 5C, and 5D individually illustrate examples of display change realized by performing the preventing processing according to the embodiment in a case of moving the object.

(II-1) Cancel Processing

The operation for moving the object O1 (for example, a drag operation with an operation using an operation device such as a mouse or a touch operation as an example of the user operation, hereinbelow, similar) is performed in a direction illustrated by an arrow in FIG. 3A, and the object O1 is moved with the operation. With the movement of the object O1, a state illustrated in FIG. 3B is obtained and the information processing device according to the embodiment determines that the competition between the object O1 and the object O2 occurs.

It is determined that the competition between the object O1 and the object O2 occurs. For example, even in a case of performing the operation for moving the object O1 in a direction illustrated by an arrow in FIG. 3B, the information processing device according to the embodiment does not move the object O1 so far in the direction illustrated by the arrow. Further, in a case where the operation for moving the object O1 is not detected, the information processing device according to the embodiment cancels the moving processing performed by the operation for moving the object O1.

It is noted that, for example, it is determined that the competition between the object O1 and the object O2 occurs and the information processing device according to the embodiment at that time can cancel the moving processing performed by the operation for moving the object O1.

The object O1 is changed from a state in FIG. 3A to a state in FIG. 3B by performing the above-mentioned cancel processing after performing the operation for moving the object O1. Thereafter, the state in FIG. 3B is changed to a state in FIG. 3D. That is, by performing the above-mentioned cancel processing after performing the operation for moving the object O1, before the competition of the output region occurs, the moved object O1 is returned to the state of the object O1 before performing the operation for moving the object O1 illustrated in FIG. 3A.

Therefore, in the case of moving the object, the occurrence of the competition of the output region is prevented by performing the above-mentioned cancel processing as the preventing processing.

(II-2) Interrupt Processing

The operation for moving the object O1 is performed in the direction illustrated by the arrow in FIG. 3A, and the object O1 is thus moved with the operation. The state illustrated in FIG. 3B is obtained by moving the object O1, and the information processing device according to the embodiment determines that the competition between the object O1 and the object O2 occurs. Further, the information processing device according to the embodiment determines that the competition between the object O1 and the object O2 occurs and, at that time, interrupts the moving processing performed by the operation for moving the object O1.

The object O1 is changed from the state in FIG. 3A to the state in FIG. 3B by performing the above-mentioned interrupt processing after performing the operation for moving the object O1.

Therefore, the occurrence of the competition of the output region is prevented by performing the above-mentioned interrupt processing as the preventing processing in the case of moving the object.

(II-3) Modifying Processing

The operation for moving the object O1 is performed in the direction illustrated by the arrow in FIG. 3A, and the object O1 is moved with the operation. The state illustrated in FIG. 3B is obtained by moving the object O1, and the information processing device according to the embodiment determines that the competition between the object O1 and the object O2 occurs.

In a case where the object is moved and it is determined that the competition between the object O1 and the object O2 occurs, the information processing device according to the embodiment performs, for example, processing illustrated in the following (A) or (B) as the modifying processing.

(A) Change Transparency of Object

The information processing device according to the embodiment determines that the competition between the object O1 and the object O2 occurs and, at that time, changes the transparency of one or two or more objects in a plurality of objects with the competition of the output region. That is, in the example illustrated in FIGS. 3A, 3B, 3C, 3D, 3E, and 3F, the information processing device according to the embodiment changes the transparency of the object of one or both of the object O1 and the object O2 with the competition of the output region.

Herein, as mentioned above, the information processing device according to the embodiment adjusts the α value of one or both of the object O1 and the object O2 with the competition of the output region with, for example, the alpha blending, thereby changing the transparency of the object of one or both of the object O1 and the object O2 with the competition of the output region. Further, the information processing device according to the embodiment may change, for example, the transparency of only a part where the competition of the output region occurs in the object O1 and the object O2.

Herein, for example, it is possible to suppress the possibility that the movement of the object O1 disturbs the use of the object O2 of the user who uses the object O2 as a result of changing the transparency of the object to increase the transparency of the object O1. It is noted, obviously, that the transparency of the object can be changed to further reduce the transparency of the object O1.

Further, in a case where it is not determined that the competition between the object O1 and the object O2 occurs as a result of more movement of the object O1, the information processing device according to the embodiment returns, for example, the changed transparency of the object to the original.

Therefore, the occurrence of the competition of the output region enables reduction of the possibility for deteriorating user's convenience by performing the above-mentioned modifying processing as the preventing processing in the case of changing the size of the object.

(B) Change of Display Method of Display Region

The information processing device according to the embodiment determines that the competition between the object O1 and the object O2 occurs and, at that time, changes a display method of the display regions of one or two or more objects in a plurality of objects with the competition of the output region to prevent the competition of the output region.

(B-1) First Example of Changing How to Display Region

In a case of performing the operation for moving the object O1 in a direction illustrated by an arrow in FIG. 3B after determining that the competition between the object O1 and the object O2 occurs, the information processing device according to the embodiment moves the object O1 with the operation. However, for example, in the case of determining that the competition between the object O1 and the object O2 occurs, as illustrated in FIG. 3E, the information processing device according to the embodiment does not change the display of the object O1 with the operation for moving the object O1.

Further, in the case where it is not determined that the competition between the object O1 and the object O2 occurs, as illustrated in FIG. 3F, the information processing device according to the embodiment allows the object O1 to be displayed at a position corresponding to the operation for moving the object O1, and the object O1 to follow the operation.

The object O1 is changed from a state in FIG. 3A to a state in FIG. 3B and a state in FIG. 3E by performing the above-mentioned modifying processing after performing the operation for moving the object O1. Thereafter, the state in FIG. 3E is changed to a state in FIG. 3F. That is, the competition of the output region does not occur by performing the above-mentioned modifying processing after performing the operation for moving the object O1.

Therefore, the occurrence of the competition of the output region is prevented by performing the above-mentioned modifying processing as the preventing processing in the case of moving the object.

(B-2) Second Example of Changing How to Display Display Region

It is determined that the competition between the object O1 and the object O2 occurs and, at that time, the information processing device according to the embodiment rotates one or both of the object O1 and the object O2 to prevent the generation of the competition between the object O1 and the object O2.

A case of rotating the object O1 is given as an example. As a result of performing the above-mentioned modifying processing after performing the operation for moving the object O1, the object O1 is changed from a state in FIG. 4A to a state in FIG. 4B, to a state in FIG. 4C, thereafter changed from the state in FIG. 4C to a state in FIG. 4D. That is, the competition of the output region does not occur by performing the above-mentioned modifying processing after performing the operation for moving the object O1.

Therefore, the occurrence of the competition of the output region is prevented by performing the above-mentioned modifying processing as the preventing processing in the case of moving the object.

(B-3) Third Example of Changing How to Display Display Region

In the case where it is determined that the competition between the object O1 and the object O2 occurs, the information processing device according to the embodiment changes, for example, the size of one or both of the object O1 and the object O2 to be temporarily small so as not to generate the competition between the object O1 and the object O2.

As an example, a case of temporarily reducing the size of the object O1 is exemplified. The object O1 is changed from a state in FIG. 5A to a state in FIG. 5B, to a state in FIG. 5C by performing the above-mentioned modifying processing after performing the operation for moving the object O1. Thereafter, the state in FIG. 5C is changed to a state in FIG. 5D. That is, the competition of the output region does not occur by performing the above-mentioned modifying processing after performing the operation for moving the object O1.

Therefore, the occurrence of the competition of the output region is prevented by performing the above-mentioned modifying processing as the preventing processing in the case of moving the object.

(B-4) Fourth Example of Changing How to Display Display Region

The information processing device according to the embodiment can perform, for example, processing with combination of the processing in the second example for changing how to display the display region illustrated in the above (B-2) and the processing in the third example for changing how to display the display region illustrated in the above (B-3).

It is possible to easily prevent the occurrence of the competition of the output region by performing the processing with the above-mentioned combination as modifying processing relating to the preventing processing. Therefore, the occurrence of the competition of the output region is prevented also in the case of moving the object and performing the processing with the above-mentioned combination as the modifying processing relating to the preventing processing.

The information processing device according to the embodiment can perform, for example, the above-mentioned preventing processing as the processing of the information processing method according to the embodiment.

In a system under environment where it is capable of a simultaneous operation by a plurality of persons illustrated in the examples in FIGS. 2A, 2B, 2C, 3A, 3B, 3C, 3D, 3E, 3F, 4A, 4B, 4C, 4D, 5A, 5B, 5C, and 5D as a result of performing the preventing processing by the information processing device according to the embodiment, such a scheme is realized to enable the prevention of the occurrence of the competition of the output region or the suppression of influence due to the occurrence of the competition of the output region.

Therefore, under the environment where it is capable of the simultaneous operation by a plurality of persons illustrated in the examples in FIGS. 2A, 2B, 2C, 3A, 3B, 3C, 3D, 3E, 3F, 4A, 4B, 4C, 4D, 5A, 5B, 5C, and 5D as a result of performing the preventing processing by the information processing device according to the embodiment, the individual users can use the system safely under the environment without continuously paying attention to a using situation of the system under the environment by another user. Further, a comfortable user operation is possible under the environment where it is capable of the simultaneous operation by a plurality of persons illustrated in the examples in FIGS. 2A, 2B, 2C, 3A, 3B, 3C, 3D, 3E, 3F, 4A, 4B, 4C, 4D, 5A, 5B, 5C, and 5D as a result of performing the preventing processing by the information processing device according to the embodiment.

Therefore, the convenience for users can be improved as a result of performing the above-mentioned preventing processing as the processing of the information processing method according to the embodiment by the information processing device according to the embodiment. Further, it is possible to promote the use of the system under the environment where it is capable of the simultaneous operation by a plurality of persons illustrated in the examples in FIGS. 2A, 2B, 2C, 3A, 3B, 3C, 3D, 3E, 3F, 4A, 4B, 4C, 4D, 5A, 5B, 5C, and 5D by more users as a result of performing the preventing processing by the information processing device according to the embodiment.

It is noted that the preventing processing according to the embodiment is not limited to the above-illustrated examples.

For example, in a case where the output region according to the embodiment is a region corresponding to the sound directivity, it is possible to prevent the occurrence of the competition of the output region and further suppressing the influence due to the occurrence of the competition of the output region as a result of changing the sound directivity, the volume, the sound stereoscopic position, combination therewith, or the like by the information processing device according to the embodiment.

[1-3] Another Example of Processing of Information Method According to the Embodiment As processing of an information method according to the embodiment, the information processing device according to the embodiment performs, for example, the "competitive notification control processing" in the first example and the "preventing processing" in the second example.

It is noted that the "competitive notification control processing" in the first example and the "preventing processing" in the second example are obtained by separating the processing of the information processing method according to the embodiment for convenience. Therefore, the processing of the information processing method according to the embodiment can be regarded that, for example, the "competitive notification control processing" in the first example and the "preventing processing" in the second example are individually two or more processing (depending on an arbitrary separating method).

[2] Example of Processing of Information Processing Method According to the Embodiment Next, an example is illustrated of the above-mentioned processing of the information processing method according to the embodiment. Hereinbelow, an example is illustrated of the processing of the information processing method according to the embodiment in a case where the individual display regions of a plurality of objects in which the output regions are simultaneously displayed are illustrated and the priority is set to the individual objects.

Figure 6:
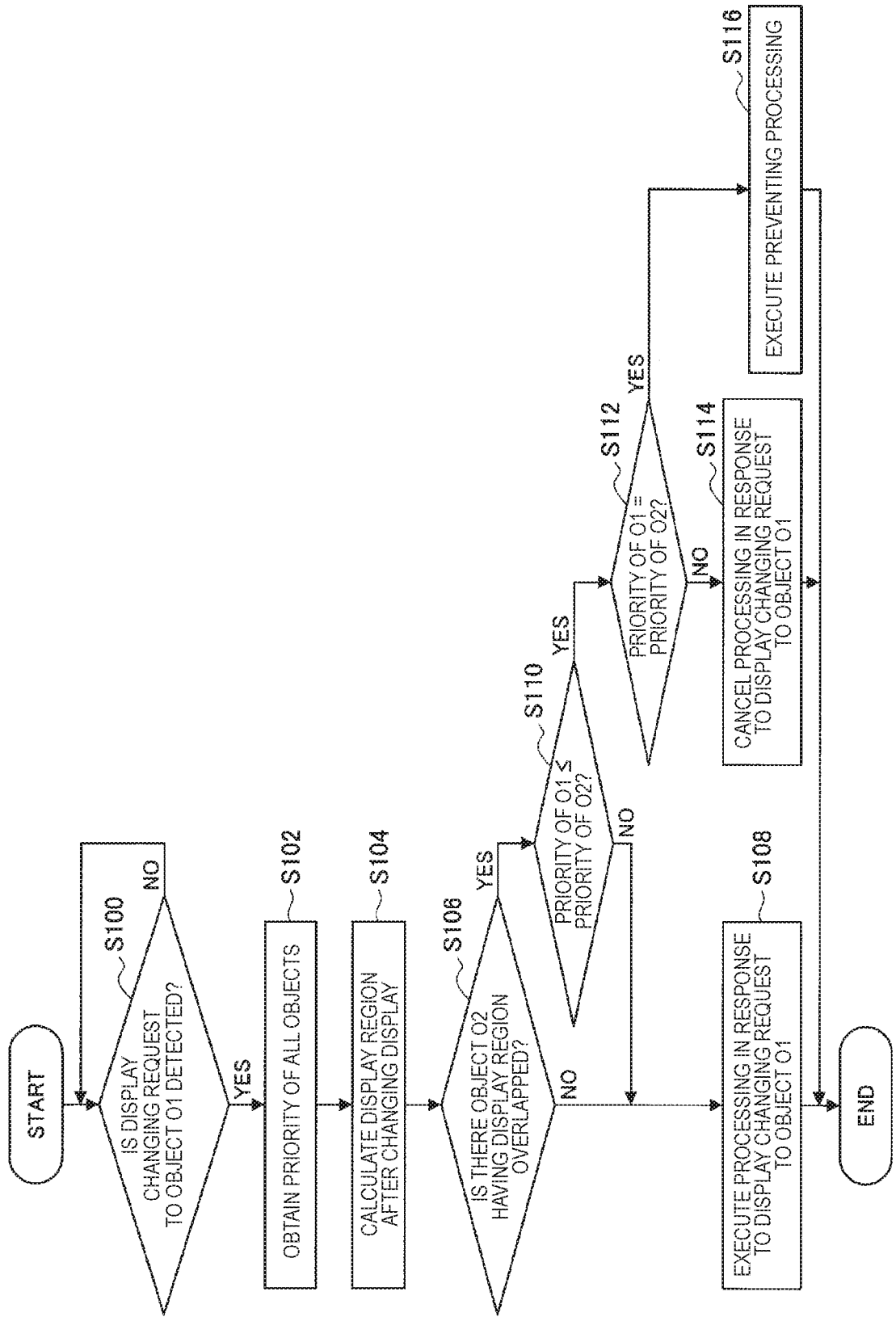
FIG. 6 is a flowchart illustrating an example of processing of the information processing method according to the embodiment.

FIG. 6 is a flowchart illustrating an example of the processing of the information processing method according to the embodiment. Herein, in FIG. 6, an object as a target for performing the operation by the user is illustrated as an "object O1" for convenience of a description. An object with the competition of the output region is illustrated as an "object O2" by performing processing corresponding to the operation to the object O1. That is, in an example of the processing of the information processing method according to the embodiment illustrated in FIG. 6, the object O1 can be replaced to an arbitrary object that can be the target for performing the operation by the user.

The information processing device according to the embodiment determines whether or not a display changing request to the object O1 is detected (S100).

According to the embodiment, the display changing request is data including, for example, a processing command for changing the display of the object, such as a command for enlarging the object and a command for moving the object. The display changing request to the object O1 is generated by the information processing device according to the embodiment or an external device of the information processing device according to the embodiment on the basis of, for example, the user operation to the object O1 such as the operation for pressing the expand button of the object O1 or the pinch operation to the object O1.

In a case where it is not determined in step S100 that the display changing request to the object O1 is detected, the information processing device according to the embodiment does not move forward the processing until it is determined that the display changing request to the object O1 is detected.

Further, in a case where it is determined in step S100 that the display changing request to the object O1 is detected, the information processing device according to the embodiment obtains the priority of all the objects (S102). All the objects obtained in step S102 may be, for example, all the objects that are displayed on the display screen or all the objects that can be displayed on the display screen.

Herein, the priority of the object according to the embodiment is set with, for example, the following components, or the combination of the following two or more components.

User operation (for example, the priority of the object that is under a drag operation is set to be higher, etc.)

Display content of object (for example, the priority of the object as a reproducing state of a moving image is set to be higher, etc.)

Time (for example, as the passage time after the "user operation is longer, the priority of the object is set to be lower", "as the passage time after the shift to a Web page of the object is longer, the priority of the object is set to be lower", etc.)

State of the user (for example, "the priority of the object viewed by the user is set to be higher", "as the distance between the hand of the user (one example of the operation member) and the object is shorter, the priority of the object is set to be higher", etc.)

User who performs the operation (for example, the priority of the object corresponding to a father (or the object that a father operates) is set to be higher than the priority of the object corresponding to a child, etc.)

Money paid to the object (for example, regarding the object that displays advertisement to which higher advertisement costs are paid, the priority of the object is set to be higher, etc.)

It is noted that how to set the priority of the object according to the embodiment is not limited to the setting with the above-mentioned component, or the combination of two or more of the components. For example, the priority of the object according to the embodiment may be set to an arbitrary method capable of setting the priority of the object. Further, the processing for setting the priority of the object may be performed by the information processing device according to the embodiment, or an external device of the information processing device according to the embodiment.

The information processing device according to the embodiment calculates the display region of the object O1 after changing the display in response to the display changing request (S104). The information processing device according to the embodiment calculates the display region of the object O1 after the changing the display by simulating the display region in a case of executing processing in response to, for example, a processing command included in the display changing request.

It is noted that FIG. 6 illustrates the example in which the processing in step S104 is performed after the processing in step S102. The processing in step S102 and the processing in step S104 can be independently performed. Therefore, the information processing device according to the embodiment may perform, for example, the processing in step S102 after the processing in step S104, or perform in parallel the processing in step S102 and the processing in step S104.

The information processing device according to the embodiment determines whether or not there is the object O2 having the display region that is overlapped to the object O1 (S106). Herein, the processing in step S106 corresponds to the processing for determining the occurrence of the competition of the output region.

In a case where it is not determined in step S106 that there is the object O2 with the overlapped display region, the information processing device according to the embodiment executes processing (for example, the expanding processing of the object O1, processing for moving the object O1, etc.) in response to the display changing request to the object O1 (S108).

Further, in the case of determining in step S106 that there is the object O2 with the overlapped display region, the information processing device according to the embodiment determines whether or not the priority set to the object O1 is the priority set to the object O2 or less (S110).

In a case where it is not determined in step S110 that the priority set to the object O1 is the priority set to the object O2 or less, the information processing device according to the embodiment executes the processing in the step S108.

Further, in a case where it is determined in step S110 that the priority set to the object O1 is the priority set to the object O2 or less, the information processing device according to the embodiment determines whether or not the priority set to the object O1 is the same as the priority set to the object O2 (S112).

In a case where it is not determined in step S112 that the priority set to the object O1 is the same as the priority set to the object O2, the information processing device according to the embodiment cancels the processing in response to the display changing request to the object O1 (S114).

Further, in the case where it is determined in step S112 that the priority set to the object O1 is the same as the priority set to the object O2, the information processing device according to the embodiment executes the preventing processing (S116). Further, in the case where there is not the object O2 whose display region is overlapped to that of the object O1 after performing the preventing processing, the information processing device according to the embodiment returns the display of the object changed by the preventing processing to the original display.

The information processing device according to the embodiment performs, for example, processing illustrated in FIG. 6 as the processing of the information processing method according to the embodiment.

In a case of performing the processing illustrated in FIG. 6, the priority is given to the display of the object to which higher priority is set. Further, in the case of performing the processing illustrated in FIG. 6, the preventing processing is performed in a case where the display regions of the objects with the same priority are overlapped to each other by the processing in response to the display changing request. By performing the preventing processing, for example, the occurrence of the overlap of the display region, that is, the occurrence of the competition of the output region is prevented, or the influence due to the occurrence of the competition of the output region is suppressed.

Therefore, for example, by performing the processing illustrated in FIG. 6, the information processing device according to the embodiment can improve the convenience of user. It is noted that, obviously, the processing of the information processing method according to the embodiment is not limited to the example in FIG. 6.

Information Processing Device According to the Embodiment

Next, a description will be given of an example of a configuration of the information processing device according to the embodiment that can perform the above-mentioned processing of the information processing method according to the embodiment.

Figure 7:
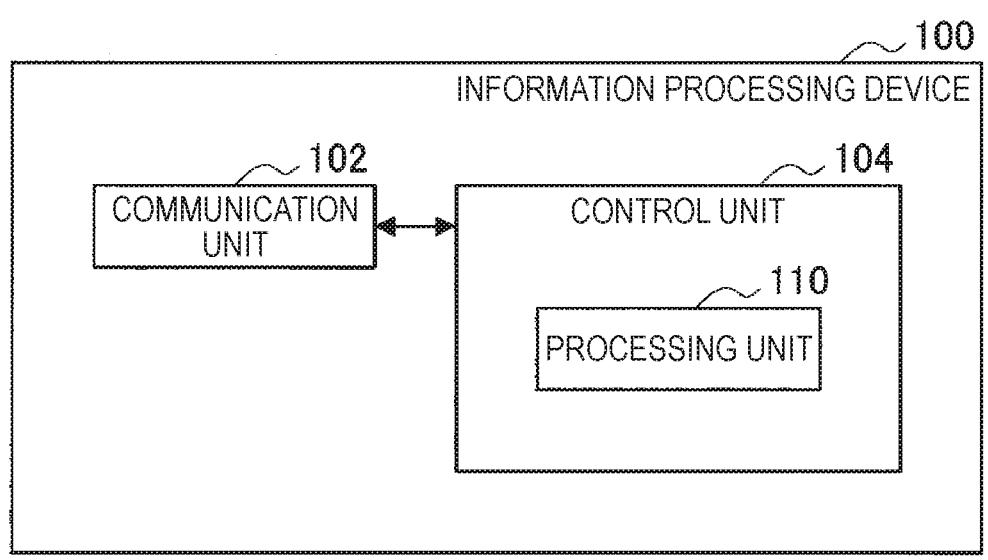
FIG. 7 is a block diagram illustrating an example of a configuration of an information processing device according to the embodiment.

FIG. 7 is a block diagram illustrating an example of a configuration of the information processing device 100 according to the embodiment. The information processing device 100 includes, for example, a communication unit 102 and a control unit 104.

Further, the information processing device 100 may include, for example, a read only memory (ROM, not illustrated), a random access memory (RAM, not illustrated), a storing unit (not illustrated), an operating unit (not illustrated) that is operable by the user, a display unit (not illustrated) that displays various screens on the display screen, and the like. The information processing device 100 connects an interval between components by, for example, a bus as a data transfer path.

The ROM (not illustrated) stores a program used by the control unit 104 and data for control such as an operational parameter. The RAM (not illustrated) temporarily stores the program executed by the control unit 104.

The storing unit (not illustrated) is storing means provided for the information processing device 100, and stores various data, for example, data about the information processing method according to the embodiment, such as data (for example, a table with a correspondence between ID indicating the object and the priority, etc.) indicating the priority set to the individual objects and various application. Herein, as the storing unit (not illustrated), there are, for example, a magnetic recording medium such as a hard disk, a nonvolatile memory such as a flash memory, and the like. Further, the storing unit (not illustrated) may be detachable from the information processing device 100.

As an operating unit (not illustrated), there is an operation input device, which will be described later. Further, as a display unit (not illustrated), there is a display device, which will be described later.

Example of Hardware Configuration of Information Processing Device 100

Figure 8:
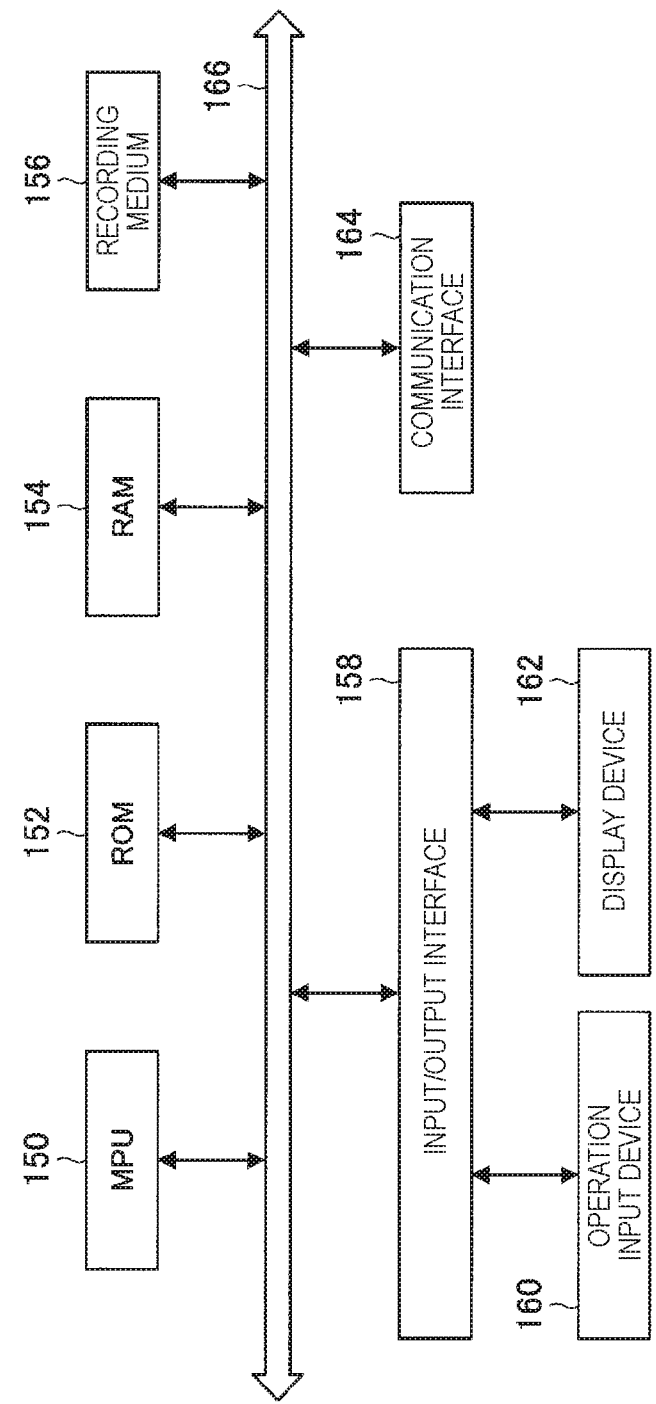
FIG. 8 is an explanatory diagram illustrating an example of a hardware configuration of the information processing device according to the embodiment.

FIG. 8 is an explanatory diagram illustrating an example of a hardware configuration of the information processing device 100 according to the embodiment. The information processing device 100 includes, for example, an MPU 150, a ROM 152, a RAM 154, a recording medium 156, an input/output interface 158, an operation input device 160, a display device 162, and a communication interface 164. Further, the information processing device 100 connects an interval between components by, for example, a bus 166 as a data transfer path.

The MPU 150 includes, for example, one or two or more processors having an operational circuit, e.g., an MPU, various processing circuits, and the like, and functions as the control unit 104 that controls the whole information processing device 100. Further, the MPU 150 plays a role of, for example, a processing unit 110, which will be described later, in the information processing device 100. It is noted that the processing unit 110 may include a dedicated (or general) circuit that can realize processing of the processing unit 110 (for example, a processor separated from the MPU 150), which will be described later.

The ROM 152 stores a program used by the MPU 150 and data for control such as an operational parameter. The RAM 154 temporarily stores, for example, a program that is executed by the MPU 150.

The recording medium 156 functions as a storing unit (not illustrated), and stores various data, for example, data about the information processing method according to the embodiment such as data indicating the priority set to the individual objects and various application. Herein, as the recording medium 156, there are, for example, a magnetic recording medium such as a hard disk and a nonvolatile memory such as a flash memory. Further, the recording medium 156 may be detachable from the information processing device 100.

The input/output interface 158 connects, for example, the operation input device 160 and the display device 162. The operation input device 160 functions as an operating unit (not illustrated) and, further, the display device 162 functions as a display unit (not illustrated). Herein, as the input/output interface 158, there are, for example, a universal serial bus (USB) terminal, a digital visual interface (DVI) terminal, a high-definition multimedia interface (HDMI) (registered trademark) terminal, various processing circuits, and the like.

Further, the operation input device 160 is provided on, for example, the information processing device 100, and is connected to the input/output interface 158 in the information processing device 100. As the operation input device 160, there are, for example, a button, a directional key, a rotary-type selector such as a jog dial, combination therewith, or the like.

Further, the display device 162 is provided on, for example, the information processing device 100, and is connected to the input/output interface 158 in the information processing device 100. As the display device 162, there are, for example, a liquid crystal display (LCD), and an organic electro-luminescence (EL) display (or called an organic light emitting diode display (OLED)), or the like.

It is noted that, obviously, the input/output interface 158 can be connected to an external device such as an external operational input device (for example, a keyboard, a mouse, or the like) or an external display device of the information processing device 100. Further, the display device 162 may be, for example, a device that can perform display and the user operation such as a touch panel.

The communication interface 164 is communication means provided for the information processing device 100, and functions as the communication unit 102 for wireless or wired communication with an external device such as an imaging device that generates a captured image by a device or imaging for performing processing such as processing for setting the priority via a network (or directly). Herein, as the communication interface 164, there are, for example, a communication antenna and a radio frequency (RF) circuit (wireless communication), an IEEE802.15.1 port and a receiving and transmitting circuit (wireless communication), an IEEE802.11 port, and a receiving and transmitting circuit (wireless communication), or a local area network (LAN) terminal and a receiving and transmitting circuit (wired communication), etc.

The information processing device 100 performs the processing of the information processing method according to the embodiment with, for example, a configuration illustrated in FIG. 8. It is noted that a hardware configuration of the information processing device 100 according to the embodiment is not limited to the configuration illustrated in FIG. 8.

For example, the information processing device 100 may not have the communication interface 164 in a case of communication with an external device via a connected external communication device or in a case of a configuration for performing processing with stand-alone. Further, the communication interface 164 may have a configuration capable of communication with one or two or more external devices by a plurality of communication systems.

Further, the information processing device 100 can have a configuration without, for example, the recording medium 156, the operation input device 160, or the display device 162.

Further, for example, the configuration illustrated in FIG. 8 (or configuration according to a modification) may be realized by one, or two or more ICs.

Referring to FIG. 7 again, a description will be given of an example of the configuration of the information processing device 100. The communication unit 102 is communication means provided for the information processing device 100, and communicates in a wireless or wired manner with an external device of a device (for example, a server or the like) that performs processing such as the processing for setting the priority via a network (or directly). Further, the communication of the communication unit 102 is controlled by, for example, the control unit 104.

Herein, as the communication unit 102, there are, for example, a communication antenna and an RF circuit, a LAN terminal and a receiving and transmitting circuit, and the like. However, the configuration of the communication unit 102 is not limited to the above. For example, the communication unit 102 can have a configuration compatible with an arbitrary standard enabling the communication with the USB terminal and the receiving and transmitting circuit and the like, or an arbitrary configuration capable of communication with an external device via a network. Further, the communication unit 102 may have a configuration capable of communication with one or two or more external devices by a plurality of communication systems.

The control unit 104 has a configuration of, for example, an MPU, and has a function for controlling the whole information processing device 100. Further, the control unit 104 has, for example, the processing unit 110 and a function of initiatively performing processing of the information processing method according to the embodiment.

The processing unit 110 has a function for initiatively performing processing of the information processing method according to the embodiment.

For example, the processing unit 110 performs the "competitive notification control processing" in the first example. In a case of performing the "competitive notification control processing" in the first example, the processing unit 110 determines the occurrence of the competition of the output region on the basis of a user operation, and allows a notification of the occurrence of the competition depending on a determining result. Further, the processing unit 110 may perform, for example, the preventing processing for the competition of the output region in a case of detecting the operation for preventing the competition of the output region after notifying the notification of the occurrence of the competition with the competitive notification control processing.

Further, the processing unit 110 can perform, for example, the "preventing processing" in the second example. In a case of performing the "preventing processing" in the second example, the processing unit 110 performs, for example, the preventing processing in the first example illustrated in the above (I) and the preventing processing in the second example illustrated in the above (II). In a case of performing the "preventing processing" in the second example, the processing unit 110 can prevent the occurrence of the competition of the output region without the notification of the competitive notification control processing or suppress the influence due to the occurrence of the competition of the output region.

The control unit 104 initiatively performs the processing of the information processing method according to the embodiment (for example, the "competitive notification control processing" in the first example or the "preventing processing" in the second example), for example, with the processing unit 110.

The information processing device 100 performs the processing of the information processing method according to the embodiment (for example, the "competitive notification control processing" in the first example and the "preventing processing" in the second example) with, for example, the configuration illustrated in FIG. 7.

Therefore, the information processing device 100 can improve the convenience of user with, for example, the configuration illustrated in FIG. 7.

Further, the information processing device 100 can have an effect obtained by performing the above-mentioned processing of the information processing method according to the embodiment with, for example, the configuration illustrated in FIG. 7.

It is noted that the configuration of the information processing device according to the embodiment is not limited to the configuration illustrated in FIG. 7.

For example, the information processing device according to the embodiment can have the processing unit 110 illustrated in FIG. 7, separately from the control unit 104 (for example, realized by another processing circuit).

Further, as mentioned above, the "competitive notification control processing" in the first example and the "preventing processing" in the second example are obtained by separating, for convenience, the processing of the information processing method according to the embodiment. Therefore, the configuration for realizing the processing of the information processing method according to the embodiment is not limited to the processing unit 110 illustrated in FIG. 7, and it is possible to have a configuration corresponding to the separation of the processing of the information processing method according to the embodiment.

Further, in a case of performing communication with an external device via, for example, an external communication device having a function or configuration similar to the communication unit 102 or processing with stand-alone, the information processing device according to the embodiment may not have the communication unit 102.

According to the embodiment, the information processing device is exemplified and described above. However, the embodiment is not limited to the above embodiment. The embodiment can be applied to various devices capable of performing the processing of the information processing method according to the embodiment, for example, a computer such as a personal computer (PC) or a server, a display device such as a table-top-type display, a projector for projecting an image on a screen, a tablet-type device, a communication device such as a mobile phone or a smartphone, or the like. Further, the embodiment can be applied to a processing IC that can be built in, for example, the above-mentioned devices.

Further, the information processing device according to the embodiment may be applied to, for example, a system having a plurality of devices assuming connection to a network such as cloud computing (or communication between the devices). That is, the above-mentioned information processing device according to the embodiment can be realized as, for example, an information processing system that performs the processing of the information processing method according to the embodiment with a plurality of devices. As the information processing system that performs the processing of the information processing method according to the embodiment with a plurality of devices, there can be, for example, a system that performs the "competitive notification control processing" in the first example and the "preventing processing" in the second example in cooperation therewith in a plurality of devices as the configuration of the information processing system.

Program According to the Embodiment

It is possible to improve the convenience of user by executing, with a processor or the like in the computer, a program (for example, a program that can execute the processing of the information processing method according to the embodiment such as the "competitive notification control processing" in the first example and the "preventing processing" in the second example that allows a computer to function as the information processing device according to the embodiment).

Further, it is possible to obtain an effect obtained by the above-mentioned processing of the information processing method according to the embodiment by executing, with a processor or the like in the computer, the program for allowing the computer to function as the information processing device according to the embodiment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the above shows that there is provided the program (computer program) for allowing the computer to function as the information processing device according to the embodiment. Further, according to the embodiment, it is possible to provide together a recording medium that stores the program.

The above-mentioned configuration illustrates an example of the embodiment and, obviously, belongs to the scope of the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing device including:
a processing unit that determines occurrence of competition of an output region on a basis of a user operation, and allows a notification of the occurrence of the competition depending on a determining result.

(2) The information processing device according to (1),
in which the processing unit determines that the competition occurs in a case where it is predicted that the competition of the output region occurs.

(3) The information processing device according to (1) or (2),
in which the processing unit determines that the competition occurs in a case of detecting the competition of the output region.

(4) The information processing device according to any one of (1) to (3),
in which the output region is a display region of each of a plurality of objects that are simultaneously displayed.

(5) The information processing device according to (4),
in which the object is linked to each user.

(6) The information processing device according to (4) or (5),
in which the competition of the output region is a state of overlapping display regions of a plurality of objects.

(7) The information processing device according to (6),
in which priority is individually set to the objects, and the competition of the output region is a state of overlapping display regions of a plurality of objects to which same priority is set.

(8) The information processing device according to any one of (1) to (7),
in which the processing unit performs preventing processing for preventing the competition of the output region in a case of detecting an operation for preventing the competition of the output region after a notification of the occurrence of the competition is sent.

(9) The information processing device according to (8),
in which the preventing processing is cancel processing of change of the output region with the user operation for the occurrence of the competition of the output region.

(10) The information processing device according to (8),
in which the preventing processing is processing for interrupt of the change of the output region with the user operation for the occurrence of the competition of the output region.

(11) The information processing device according to (8),
in which the preventing processing is processing for changing how to change the output region with the user operation for the occurrence of the competition of the output region.

(12) The information processing device according to (11),
in which, in a case where the output region is a display region of each of a plurality of objects that are simultaneously displayed,
the processing unit changes transparency of one or two or more objects in the plurality of objects with the competition of the output region as the preventing processing.

(13) The information processing device according to (11),
in which, in a case where the output region is a display region of each of a plurality of objects that are simultaneously displayed,
the processing unit changes how to display the display region of one or two or more objects in the plurality of objects with the competition of the output region so as to prevent the competition of the output region as the preventing processing.

(14) An information processing method executed by an information processing device, including:
a step of determining occurrence of competition of an output region on a basis of a user operation, and allowing a notification of the occurrence of the competition depending on a determining result.

(15) A program for causing a computer to execute:
a step of determining occurrence of competition of an output region on the basis of a user operation, and allowing a notification of the occurrence of the competition depending on a determining result.

REFERENCE SIGNS LIST

100 information processing device
102 communication unit
104 control unit
110 processing unit

The invention claimed is:
1. An information processing device, comprising:
a processing unit configured to:
control a display device to concurrently display a plurality of objects on an output region of the display device, wherein the plurality of objects comprises a first object and a second object;
predict occurrence of competition of the output region based on a first user operation for movement of the first object or the second object, a first position of the output region corresponding to the first object, and a second position of the output region corresponding to the second object, wherein
the competition of the output region corresponds to an overlap of a first display region of the first object over a second display region of the second object,
generate a notification of the predicted occurrence of the competition based on the prediction of the occurrence of the competition, wherein
the notification is generated before the occurrence of the competition of the output region,
the generated notification includes buttons, and
the buttons indicate a provision of one of execution or prevention of the overlap of the first display region over the second display region;
detect a second user operation based on the generated notification; and
execute a preventing process based on the detected second user operation to prevent the competition of the output region, wherein the preventing process comprises modification of at least one of the first display region or the second display region, and the modification of the at least one of the first display region or the second display region includes rotation of a corresponding at least one of the first display region or the second display region.

2. The information processing device according to claim 1, wherein the processing unit is further configured to determine the occurrence of the competition based on the prediction of the occurrence of the competition.

3. The information processing device according to claim 1, wherein the processing unit is further configured to determine the occurrence of the competition based on detection of the occurrence of the competition.

4. The information processing device according to claim 1, wherein the processing unit is further configured to set a priority for each of the first object and the second object, and a first priority of the first object and a second priority of the second object are same.

5. The information processing device according to claim 1, wherein the preventing process further comprises cancellation of a change of the output region, and the change of the output region is based on the first user operation.

6. The information processing device according to claim 1, wherein the preventing process further comprises interruption of a change of the output region, and the change of the output region is based on the first user operation.

7. An information processing method, comprising:

controlling a display device to concurrently display a plurality of objects on an output region of the display device, wherein the plurality of objects comprises a first object and a second object;

predicting occurrence of competition of the output region based on a first user operation for moving the first object or the second object, a first position of the output region corresponding to the first object, and a second position of the output region corresponding to the second object, wherein the competition of the output region corresponds to an overlap of a first display region of the first object over a second display region of the second object, generating a notification of the predicted occurrence of the competition based on the prediction of the occurrence of the competition, wherein the notification is generated before the occurrence of the competition of the output region, the generated notification includes buttons, and the buttons indicate a provision of one of execution or prevention of the overlap of the first display region over the second display region;

detecting a second user operation based on the generated notification; and executing a preventing process based on the detected second user operation to prevent the competition of the output region, wherein the preventing process comprises modification of at least one of the first display region or the second display region, and the modification of the at least one of the first display region or the second display region includes rotation of a corresponding at least one of the first display region or the second display region.

8. A non-transitory computer-readable medium having stored thereon, computer executable-instructions that, when executed by a processor, cause the processor to execute operations, the operations comprising:

controlling a display device to concurrently display a plurality of objects on an output region of the display device, wherein the plurality of objects comprises a first object and a second object;

predicting occurrence of competition of the output region based on a first user operation for moving the first object or the second object, a first position of the output region corresponding to the first object, and a second position of the output region corresponding to the second object, wherein the competition of the output region corresponds to an overlap of a first display region of the first object over a second display region of the second object, generating a notification of the predicted occurrence of the competition based on the prediction of the occurrence of the competition, wherein the notification is generated before the occurrence of the competition of the output region, the generated notification includes buttons, and the buttons indicate a provision of one of execution or prevention of the overlap of the first display region over the second display region;

detecting a second user operation based on the generated notification; and executing a preventing process based on the detected second user operation to prevent the competition of the output region, wherein the preventing process comprises modification of at least one of the first display region or the second display region, and the modification of the at least one of the first display region or the second display region includes rotation of a corresponding at least one of the first display region or the second display region.

* * * * *